United States Patent [19]

Franklin

[11] 4,232,739
[45] Nov. 11, 1980

[54] AQUEOUS POLYSACCHARIDE-CONTAINING FLUID HAVING SUPERIOR FILTERABILITY AND STABILITY AND THEIR USE IN RECOVERING OIL

[75] Inventor: Barbara J. Franklin, Houston, Tex.

[73] Assignee: Texaco Inc., White Plains, N.Y.

[21] Appl. No.: 905,490

[22] Filed: May 12, 1978

[51] Int. Cl.³ .............................................. E21B 43/16
[52] U.S. Cl. ................................... 166/275; 166/246; 252/8.55 D; 252/8.55 R
[58] Field of Search ............ 252/8.55 D, 8.55 R, 252/316; 166/246, 275

[56] References Cited

U.S. PATENT DOCUMENTS

| | | | |
|---|---|---|---|
| 3,096,284 | 7/1963 | Slate | 252/8.55 R |
| 3,373,810 | 3/1968 | Williams | 166/246 |
| 3,625,889 | 12/1971 | Brunscum | 166/246 X |
| 3,908,760 | 9/1975 | Clampitt | 166/246 |
| 4,104,193 | 8/1978 | Carter et al. | 252/8.55 D |

*Primary Examiner*—Benjamin R. Padgett
*Assistant Examiner*—J. L. Barr
*Attorney, Agent, or Firm*—Carl G. Ries; Thomas H. Whaley; Jack H. Park

[57] ABSTRACT

The injectability, filterability and stability, especially resistance to precipitation on contact with water containing relatively high content of boron salts such as borates, of an aqueous polysaccharide-containing fluid for use in viscous oil recovery operations is improved by prehydrating the polysaccharide in fresh water of low boron content followed by shearing for a period of time sufficient to provide desirable filtration properties following by dilution with field brine followed by a second shearing step prior to injecting the aqueous fluid into the formation.

13 Claims, No Drawings

AQUEOUS POLYSACCHARIDE-CONTAINING FLUID HAVING SUPERIOR FILTERABILITY AND STABILITY AND THEIR USE IN RECOVERING OIL

FIELD OF THE INVENTION

This invention concerns an enhanced oil recovery process. More specifically, this invention concerns a process for recovering oil from a subterranean formation by injecting thereinto an aqueous fluid containing a hydrophilic, viscosity increasing polysaccharide polymer. Still more specifically, this invention concerns a method of preparing the polymer-containing fluid as a result of which the aqueous fluid is more easily injected into the formation with a reduced amount of injection problems, and the compound is much less sensitive to subsequent precipitation upon contacting water having high contents of borate and other boron containing compounds.

BACKGROUND OF THE INVENTION

The use of water injection or waterflood operations to recover oil from subterranean reservoirs is a well known and commonly employed practice in the petroleum industry. A typical waterflood comprises injecting an aqueous flooding medium, e.g. water, into the reservoir to drive oil through the reservoir toward one or more production wells from which it can be collected at the surface of the earth. Unfortunately, the injected water tends to channel through certain portions of the reservoir, while completely bypassing other portions of the reservoir. This inability of water to sweep a substantial percentage of the volume of the reservoir within the pattern of the wells employed in the waterflood operation seriously affects the ultimate recovery of oil, and detracts from the economic attractiveness of the operation. Accordingly, there is a need to improve the sweep efficiency of waterfloods and this need has long been recognized by persons working within the oil industry.

It is taught in the art that poor sweep efficiency is a result of several factors. One is the natural tendency of the liquid to flow in the path of least resistance; hence, water flows through the highly permeable portions of the heterogeneous reservoir more readily than through the less permeable portions. Another factor involves the difference between the mobilities of the injected water and the oil present in the reservoir. In both instances, sweep efficiency of a reservoir can be improved by increasing the viscosity of the injected water.

The use of hydrophilic, viscosity-increasing additives for flood water is known and practiced in the art, and commonly employed additive for this purpose include partially hydrolyzed polyacrylamides, copolymers of acrylamide and acrylates, and one of the very promising groups of thickeners, ionic polysaccharides, particularly the polysaccharide prepared by employing bacteria of the genus Xanthomonas and commonly referred to as polysaccharide B-1459.

While polysaccharides exhibit many advantageous performance characteristics, and are preferred over other hydrophilic polymers in many applications, certain problems have been identified which limit their effectiveness, at least in certain reservoirs. The most effective and desirable polysaccharides from the standpoint of developing high viscosity at relatively low concentration levels, are somewhat difficult to disperse completely in relatively saline environments, e.g. in field brines containing more than about 50,000 parts per million total dissolved solids. Additionally, problems are known to exist in connection with polysaccharides which manifest themselves as loss of viscosity over long periods of time. Oxidative degradation was identified early in the course of examining these compounds, and it is now common practice to disperse polysaccharides in low oxygen-containing water, and to further protect them again oxidative degradation by incorporating an oxygen scavenger in the fluid. Two unexpected problems have been identified, which are encountered whenever the fluids are prepared in, or when the fluids are brought into contact with, water containing appreciable concentrations of water soluble borates or other boron containing compounds. The first problem is especially severe when the polysaccharide contains at least ten percent D-mannose, and the above-identified polysaccharide contains 33 percent D-mannose. When fluids containing fully hydrated and dispersed polysaccharides which are comprised of at least 10 percent mannose, contact water containing in excess of 7.5 parts per million borates (as boron), precipitation occurs which is manifest in significant loss of fluid viscosity. The reaction is not instantaneous, but occurs slowly after contact between polysaccharide and borate has continued for more than about 30 days at temperatures above 120° F. Since the viscosity loss is precisely the same symptom as results from oxidative degradation of the polysaccharide, it is not immediately apparent to those employing these fluids which phenomena is responsible for the observed loss in viscosity of solution. A second, possibly related problem is concerned with injectivity problems. Problems such as plugging, especially in tight or low permeability formations, are encountered whenever the fluid is prepared by initially hydrating the polysaccharide in water containing more than about 1.7 ppm boron.

In view of the foregoing discussion, it can be appreciated that there is a serious, unfulfilled need for a method for preparing an aqueous, hydrophilic polymer-containing fluid, particularly a fluid containing polysaccharides such as polysaccharide B-1459, or any polysaccharide containing sufficient mannose to cause it to be sensitive to borates, so as to eliminate or reduce the sensitivity of the polysaccharide fluid to subsequent contact with borates, and further to ensure that the fluid may be easily injected into a formation without danger of plugging small flow channels.

DESCRIPTION OF THE PRIOR ART

Mixing instructions supplied by vendors of polysaccharides such as those discussed above teach that the fluid should be pre-hydrated in a concentrated form in fresh water and mixed at a high shear rate, prior to diluting with field brine and injecting the material into the formation, but do not teach the criticality of the boron content of the water used for prehydration, nor does it teach the second shearing step.

SUMMARY OF THE INVENTION

An aqueous fluid containing a polysaccharide such as polysaccharide B-1459 can be prepared by my process with improved properties making it more suitable for use in waterflooding oil recovery operations, whereby reduced injectivity problems are encountered, and sensitivity of the fluid to subsequent contact with water containing in excess of 8.5 parts per million water soluble borate salts (as boron) is reduced. The fluid is prepared by pre-hydrating the polysaccharide in relatively fresh water, e.g. water whose salinity is less than 15,000 parts per million and preferably less than 6,000 parts per million total dissolved solids, which water contains less than 7.5 parts per million water soluble borates and other boron containing compounds, (expressed as boron) and preferably less than 1.7 ppm. The fluid is next subjected to high shear mixing for a period of time sufficient to ensure that the compound is so well dispersed that it will pass through a 3 $\mu$m filter. This is readily accomplished by shearing the fluid in a high shear rotary shearing commercial Waring Blendor ®, as Model 7011, 120 V (high setting) device for at least 1 minute or passing the fluid through at least one and preferably a series of 3 or more shear plates in series each containing one or more orifices, with from 300 to 900 and preferably from 400 to 800 pounds per square inch differential pressure across the series of shear plates. The concentrated fluid comprising sheared polymer in fresh, low boron-containing water is then diluted with field brine whose salinity is in the range of from 1000 to 225,000 parts per million total dissolved solids, which may include substantially more than 7.5 parts per million boron in the form of water soluble borates, in a ratio which produces a fluid having a salinity of about 900 to 200,000 parts per million total dissolved solids and polymer concentration of from 10 to 5000 and preferably 50 to 2000 parts per million. The diluted fluid is then subjected to a second shearing step similar to that described above, except that in shearing by passing through a series of three or more shear plates, the differential pressure should be from 700 to 1900 and preferably from 800 to 1800 pounds per square inch. The resultant fluid exhibits improved injectivity properties and resistance to loss of viscosity due to precipitation of polymer upon contacting normally detrimental levels of borate, significantly more than a fluid prepared by the prior art technique, even if the total shear to which the fluid is subjected in a single shearing step between the pre-hydration and dilution in brine steps is greater than the amount of shear to which the fluid is subjected in the double shear technique described above.

DESCRIPTION OF THE PREFERRED EMBODIMENTS

Briefly, the process of my invention concerns a method of preparing an aqueous viscous fluid containing a polysaccharide, hydrophilic polymer, which fluid exhibits substantially improved properties with respect to injectability and stability at elevated temperatures over long periods of time, and to an oil recovery process in which the fluid is injected into a formation to displace oil therethrough toward a remotely located production well, from which it can be collected and transported to the surface of the earth.

The polymer to be used in the present invention is a polysaccharide, particularly any polysaccharide containing more than about 10 percent D-mannose, and the particular polysaccharide to which the tests to be described hereinbelow relate, is polysaccharide B-1459 as defined below. Surprisingly, other polysaccharides, and other polymers commonly employed for a similar purpose, including partially hydrolyzed polyacrylamides, do not show an improvement in stability and injectability when the polymer is incorporated in a fluid prepared in accordance with the process of my invention.

In accordance with the present invention, a solution or aqueous dispersion as described above and more fully herein below, is employed in a new and improved process for recovering oil and petroleum from a subterranean reservoir penetrated by spaced apart injection and production means which define a recovery zone. As will be understood by those skilled in the art, the term recovery zone as used herein means that portion of the reservoir through which oil is displaced from the injection means to the production means, which generally comprise one or more wells extending from the surface of the earth into the recovery zone. Such wells may be located and spaced from one another in any of several known patterns. For example, the wells may be arranged in lines or rows which are generally arranged parallel to one another on the surface of the earth, in which case the pattern is referred to as a line drive flood. Other arrangements which may be used include those in which a central injection well is surrounded by a plurality of production wells, which arrangement may be a five-spot, seven-spot, or other similar patterns.

In the oil recovery process practiced according to the process of my invention, oil is recovered from a recovery zone by means of a waterflood operation wherein aqueous flooding fluid, e.g. water having dissolved or dispersed therein a thickening amount of an ionic polysaccharide selected from the group of hetero polysaccharides prepared by employing the bacteria of the genus Xanthomonas. Of these hetersaccharides, the polysaccharide B-1459 is a preferred polysaccharide. Polysaccharide B-1459 contains D-glucose, D-mannose and D-glucorinoc acid groups in the ratio of 2.8:3.0:2.0. It also contains about 3.5 percent by weight pyruvic acid and about 4.7 percent by weight acetic acid. The acetic acid is present as the O-acetyl ester, whereas the pyruvic acid is attached through a ketal linkage. The polysaccharide B-1459 is produced by culturing bacteria *Xanthomonas Campestris* in RRLB-1459 United States Department of Agriculture, on a well aerated medium having a pH of about 7 and containing commercial glucose, organic nitrogen sources, dipotassium hydrogen phosphate, and appropriate trace elements. The preferred fermentation temperature during the culturing is about 28° C. (82° F.). The fermentation reaction is completed is about 96 hours or less. Bacterial cells and suspended impurities are removed from the fermentation product by centrifugation after adjusting the pH to a value from about 5 to about 6. The polysaccharide B-1459 is precipitated from the centrifuged fermentation product by adding solvent and a low molecular weight alcohol thereto.

Polysaccharide B-1459 is now a relatively standard product. Its molecular weight is estimated to be in the range of several million. This polysaccharide is now commercially available under the tradename "XANFLOOD" from Xanco Company. The product was previously available commercially under the tradename "Kelzan".

Experiments pursuant to a proposed oil recovery application employing aqueous fluids containing polysaccharide B-1459 in field brines revealed certain problems. As is taught in the art, the polysaccharide is subject to oxidative degradation which is manifest by a loss in viscosity of the fluid. This viscosity reduction, which can reduce the viscosity of a typical fluid containing from 500 to 1500 parts per million polysaccharide polymer, which exhibits an initial viscosity in the range of from about 15 to about 60 centipoise, by an amount in the range of from 25 to 75 percent of the initial viscosity over a period of about 7 days. The rate of loss is, of course, dependent on many factors including the temperature at which the fluid is stored. The viscosity of the fluid begins dropping almost immediately when the source of the viscosity loss is oxidative degradation of the compound, and decreases relatively uniformly with time. It was observed in laboratory experiments employing the above-identified polysaccharide, that when great care was taken to exclude oxygen from the water from which the fluid was prepared and an oxygen scavenger such as sodium hydrosulfite was employed to prevent any subsequent contamination with oxygen from reducing the viscosity due to oxidative degradation, that another apparently unrelated phenomena was occurring which also gave rise to a reduction in viscosity of the fluid. When the viscosity was determined as a function of time for fluids prepared according to the prior art techniques, i.e. in which the fluid is prehydrolyzed in fresh water and sheared followed by dilution with brine and low shear mixing, the viscosity of 100 parts per million polymer fluid in 95,000 parts per million salinity brine declined at a steady rate from an initial value of 35 centipoise at 10 sec$^{-1}$ to about 27 after about ten weeks. Beyond ten weeks, a break in the curve was observed and the viscosity declined much more rapidly thereafter to a value of about 10 centipoise after a total of 16 weeks. These tests were conducted at 74° C. (165° F.). It was established that viscosity loss due to oxidative degradation gives rise to a different shaped curve, the viscosity loss beginning almost immediately and declining more rapidly. Thus another phenomenon was clearly responsible for the loss in viscosity, and it was ultimately determined that cross-linking between D-mannose units of the polysaccharide was being induced by presence of borates in the brine in which the final fluid was prepared. The cause of the precipitation which causes loss of fluid viscosity was identified as being related to a cross-linking or bonding that occurs from D-mannose groups within the polysaccharide molecule. Although it has not been clearly verified, it is believed that the reduction in this problem resulting from application of the process of my invention to be described more fully hereinafter below results from the fact that when the fluid is prehydrolyzed, sheared, diluted with brine, and sheared a second time according to my invention as more fully described below, subsequent bonding between mannose groups on contacting borates will occur between mannose groups of the same polysaccharide molecule, which will not increase the effective molecular weight of the polymer and hence will not cause precipitation of the polymer and loss of fluid viscosity. In fluids prepared according to the prior art techniques, which are not double sheared according to my process, bonding or cross-linking between mannose groups includes a significant portion occurring between mannose groups in different molecules, which gives rise to the problems of the precipitation of polymer and loss of fluid viscosity.

The process of my invention requires a minimum of four steps, which are defined precisely below. Briefly, these steps comprise the following.

(1) The polysaccharide is prehydrolyzed in relatively fresh water, which water contains significantly less than 7.5 and preferably less than 1.7 parts per million water soluble borates (as boron). The prehydrolyzed fluid will ordinarily contain substantially higher concentrations of polymer than the fluid used for oil recovery contains.

(2) The concentrated, fresh water prehydrolyzed fluid is then sheared at a rate and for a time sufficient to ensure that the first fluid is fully dispersed, and that essentially no aggregates of polymer exist in the fluid. It is adequate if the fluid is sheared until it has obtained maximum viscosity, i.e. until further shearing does not cause significant viscosity increase.

(3) The concentrated, fresh water, sheared fluid is then diluted with field brine, which may contain in excess of 8.5 parts per million water soluble borates (as boron), to form a second fluid.

(4) The second, diluted fluid is then sheared a second time, similar or identical to the above step of shearing a fresh water concentrate of polymer, for sufficient time to ensure that the second will pass essentially completely through a 3 μm filter.

The term fresh water as used herein is by its nature inprecise. Obviously, superior results are obtained if the first fluid is prepared by dispersing polysaccharide in pure water, e.g. deionized water containing essentially no dissolved salts. While laboratory tests may be conducted along these lines, it is obviously impractical to prepare the fluid for use in the field using deionized water because of the large quantities required. For the purpose of this application, the first fluid should be prepared in water whose salinity is less than 15,000 and preferably less than 6,000 parts per million total dissolved solids, having a concentration of divalent ions less than 2000 and preferably less than 500 parts per million. The concentration of water soluble borates, expressed as boron, should be less than 7.5 and preferably less than 1.7 parts per million. The first fluid is prepared by adding sufficient polysaccharide to form a solution whose concentration of polysaccharide is from about 0.1 to about 4.0 and preferably from 0.5 to 2.0, except of course, the concentration of polysaccharide should not be so great in the particular fresh water being employed that the resulting fluid viscosity is so high that further mixing, pumping and shearing is difficult or impossible. The fresh water used for preparing the first fluid should also contain less than about 5 and preferably less than 1 part per million iron, as iron is also known to cause cross-linking between certain elements of the polysaccharide molecules. The especially preferred concentration for preparing the first solution depends to a large degree on a particular polysaccharide being employed, in the fresh water in which it is dissolved or dispersed. It is preferred that the viscosity of the fresh water concentrate be in the range of from about 100 to about 200 centipoise at 100 reciprocal seconds.

The next step in preparing the final fluid according to the process of my invention is to shear the first (concentrated) fluid at a high rate and for a sufficient interval of time to ensure that the polymer is well dispersed and that the fluid does not contain a significant amount of agglomerated particles of polymer. This can be determined quickly by ensuring that the fluid after shearing has attained maximum viscosity, i.e., the viscosity is not increased significantly by shearing for longer periods of time. The shearing step may be accomplished by a high speed rotary shear device in the laboratory such as in a Waring Blendor ®, etc. The preferred shearing method for use in field operations involves pumping the fluid through a conduit in which is located one or more plates each containing one and preferably each containing a plurality of orifices. The preferential pressure across the shear plate is directly related to the shear rate which the fluid experiences. The orifices in the plates should be in the range of from about 1/32 to about ¼ inch (0.79–6.35 millimeters). The number of orifices in the plates is varied to provide a differential pressure across the shear plates, which is influenced by the pump pressure and capacity available and by the flow rate of fluid as desired. It is desired that the total differential pressure across a typical series of 3 or more shear plates be in the range of from about 300 to 900 and preferably from 400 to 800 pounds per square inch.

After the fresh water polymer concentrate has been sheared as described above, it is diluted with the available field brine to form the fluid to be injected into the formation. Ordinarily the concentrate is mixed with brine having a salinity of 1000 to 225,000 parts per million total dissolved solids, resulting in a solution having a polymer concentration from about 10 to about 5,000 and preferably from about 50 to about 2000 parts per million. This invention may be used in processes in which the polymer concentration is held constant or tapered in any number of ways as are described in the art. This brine may necessarily contain more than 7.5 parts per million boron, and will cause immediate agglomeration of the polymer on contacting the fresh water concentrate. The diluted fluid is then sheared a second time, in a manner similar to or the same as is described above, sufficiently to ensure that the final fluid will pass readily through a 3 μm filter. In the preferred embodiment of my process, shearing of the dilute fluid is accomplished by pumping the fluid through a series of at least 3 shear plates as described above, the total differential pressure across the shear plates being from 700 to 1900 and preferably from 800 to 1900 pounds per square inch.

I have found that by double shearing, the effect of borates on the viscosity of the fluid is greatly reduced which I speculate to be a result of the cross-linking between D-mannose units being predominantly within the same molecule as opposed to being predominantly between adjacent molecules as occurs when a single sheared fluid containing more than 7.5 parts per million boron is prepared. If the fluid is prepared by hydrating the polysaccharide directly in fluid containing more than 7.5 parts per million boron, cross-linking between mannose units in different polymer molecules will occur, resulting in severe precipitation problems. Once the problems have been encountered by preparing the fluid in this particular manner, subsequent treatment by shearing at high rates and for longer periods of time than described above, will not correct the problem. It is essential that the sequence described herein be followed precisely in order to avoid the inter-molecule bonding which results from boron induced linking of mannose groups contained in different molecules.

EXPERIMENTAL SECTION

A series of tests were conducted to study the long term heat stability of solutions containing Kelzan ® brand polysaccharide. The reservoir from which the tests were being conducted contained brine having a salinity of 106,000 parts per million total dissolved solids including 2500 parts per million divalent ions, e.g. calcium and magnesium, and 8.5 parts per million borate salts (expressed as boron). The formation temperature is 165° F. (74° C.).

A solution containing 1.0 kg/m³ (1,000 parts per million) Kelzan ® polysaccharide and 0.1 kg/m³ (100 parts per million) Dowicide B, a bactericide was prepared in a solution made up of one part fresh water to nine parts brine whose salinity was 106,000 parts per million total dissolved solids. A number of bottled samples were prepared, and stored at 74° C. (165° F.) under a nitrogen blanket in screw-capped bottles, although nitrogen purging was not employed. No oxygen scavenger was added to these samples. Samples were taken from the bottles on a random rotating basis and the viscosity was measured once each week over a 15 week period. The viscosity measurements are given in Table I below.

TABLE I

| Time Samples were Aged, Weeks | Apparent Viscosity mPaS (cp) at 10 sec$^{-1}$ |
|---|---|
| 0 | 34 |
| 2 | 32 |
| 4 | 31 |
| 6 | 30 |
| 8 | 28 |
| 10 | 26 |
| 12 | 14 |
| 14 | 11 |
| 16 | 9.8 |

It can be seen from the data above that after quiescent aging at 74° C. (165° F.), the fluid had lost over 71 percent of its original viscosity in 16 weeks. Careful inspection of the data also shows that the rate of loss occurred at a relatively slow rate until after about 10 weeks, after which the rate of viscosity loss increased dramatically. It was ultimately determined that the slow loss in viscosity during the first ten weeks resulted from oxidative degradation of the polysaccharide polymer whereas the more rapid degradation from 10 to 16 weeks resulted from a combination of oxidation plus precipitation of polymer due to cross-linking which was induced by the borate present in the field brine used for preparing the fluids.

Samples of both the precipitate and supernatant liquid were obtained from a sample which had been stored at 74° C. (165° F.) for ten weeks, and analyzed. It was determined that only one-third of the polymer originally dissolved in the fluid remained in solution after being stored for ten weeks. A sample of brine which contained no polymer was heated for the sample period of time and no precipitate was observed. Analysis of both the supernatant liquid and the precipitate for borate indicated that essentially all of the borate originally present in the brine was present in the precipitate, verifying that borate was indeed involved in the reaction which was responsible for precipitation of the polymer from solution.

Another experiment was conducted to determine the effectiveness of the soluble shearing fluid preparation method according to the process of my invention for improving the filterability of the solution, and to determine whether it had any effect on the loss of polysaccharide from solution due to precipitation, which was in turn caused by the borate content of the brine in which the fluid was prepared. A concentrate was prepared in fresh water (<1000 parts per million total dissolved solids), the concentratiion containing 10 kg/m³ (1.0% by weight) polysaccharide polymer. This concentrate was then sheared in a Waring Blendor ® for a period of 3 minutes. This solution was then diluted with brine (106,000 ppm total dissolved solids and 8.5 ppm borates as boron) to provide a solution having 1000 grams/m³ polymer (1000 parts per million), and was sheared again in the Waring Blendor ® for 20 minutes. Samples of the twice-sheared solutions of polysaccharide polymer were again stored at 74° C. (165° F.), and the viscosity determined over a period of time. The viscosity of the double sheared sample was determined to be much more stable with time, thus establishing that the twice sheared method of formulating the fluid according to the process of my invention effectively minimized the problem of cross-linking induced by borates and its effect on precipitation of polymer from solution, which caused the loss in viscosity.

Another series of tests were conducted to compare the effectiveness of shearing the dilute fluid by passing it through 3 shear plates placed in series in a conduit, each plate having from approximately 30–50 orificies, each orifice being 1/16 inches in diameter. The total differential pressure across all three plates was varied from 500 to 1500 psi. The shear rate increased as the pressure differential across the shear plate increased. Fluids were sheared by passing through the shear plate at various values or total pressure drop across the group of shear plates from 200 psi to over 1200 psi differential pressure, and samples of the fluid sheared in this manner were compared with fluids sheared as described previously in a Waring Blendor ®. The effectiveness of the shearing process was measured by measuring the filtration rate of the fluid passing through a 3 μm filter. It was determined that the filterability of polymer solution increased as the pressure drop across the shear plates increases up to about 900 psi differential pressure. Above 900 psi differential pressures, no increase in filterability was observed. Excellent filterability was obtained throughout the range from about 900 psi to about 1800 psi. At pressures around 2000 psi and greater, shear degradation of the polymer begin occurring, and so the upper limit of the pressure for shearing the polymer fluid in this manner is about 1800 psi.

It has been determined that the optimum pressure differential range for effective shearing of the dilute fluid depends somewhat on salinity, but is generally in the range of from about 700 to about 1900 and preferably from about 900 to 1800 pounds per square inch. The shear differential pressure should in all instances be maintained below the point which causes shear degradation of the polymer. It is satisfactory to shear both the concentrate and the diluted polymer solution by passing it through one or more shear plates each containing one or more orifices of the above specified size at the above stated pressure differential. It has also been determined that it is sufficient to shear both the concentrate and the diluted polymer solution at least sufficiently to obtain a fluid which will pass completely through a 3 μm filter, or to shear the fluid sufficiently to reach a filterability level with respect to a 3μ filter so the filterability will not be increased by shearing the fluid at higher differential pressures or by successive passes through the shear plates.

Thus I have disclosed and demonstrated how a polysaccharide fluid prepared according to the process of my invention exhibits improved filterability, injectability into oil formations for oil recovery purposes, and resists viscosity loss due to polymer precipitation such as is associated with contact with high borate-containing brines. While my invention has been disclosed in terms of a number of illustrative embodiments, it is clearly not so limited since many variations thereof will be apparent to persons skilled in the art of oil recovery without departing from the true spirit and scope of my invention. Similarly, while a theory has been proposed to explain certain of the benefits observed in application of the process of my invention, it is not necessarily assured that this is the only or even the principal mechanism responsible for the benefits resulting from application of my invention. It is my intention and desire that my invention be limited and restricted only by those limitations and restrictions appearing in the claims appended immediately hereinafter below.

I claim:

1. In a method of recovering oil from a subterranean, petroleum-containing formation penetrated by at least one injection well and by at least one production well, both wells being in fluid communication with the formation, said formation also containing brine containing greater than 7.5 parts per million water soluble borates (as boron) comprising injecting an aqueous viscous solution of a polysaccharide containing in excess of 10 percent D-mannose, wherein the improvement comprises preparing the fluid by the process comprising
   (a) preparing a first solution containing 0.1 to 4.0 percent by weight polysaccharide in water having a salinity less than 15,000 parts per million total dissolved solids and containing less than 7.5 parts per million water soluble borates (as boron),
   (b) shearing the first solution sufficiently to ensure that the first solution will pass readily through a 3 μm filter;
   (c) diluting the first solution with brine having greater than 50,000 parts per million total dissolved solids including more than 7.5 parts per million water soluble borates as boron, the volume ratio of the first solution and brine being sufficient to produce a second polysaccharide solution having a concentration of polysaccharide from 10 to 5,000 parts per million polysaccharide; and
   (d) shearing the second solution sufficiently to ensure that the second solution will pass readily through a 3 μm filter.

2. A method as recited in claim 1 wherein the concentration of polymer in the first solution is from 0.5 to 2.0 percent by weight.

3. A method as recited in claim 1 wherein the salinity of the water used to prepare the first solution is less than 6,000 parts per million.

4. A method as recited in claim 1 wherein the concentration of polysaccharide in the second solution is from 50 to 2000 parts per million.

5. A method as recited in claim 1 wherein step (b) is accomplished by shearing the first solution in a high shear rate rotary mixer for from 1 to 5 minutes.

6. A method as recited in claim 1 wherein step (d) is accomplished by shearing the second solution in a high shear mixer for a period of time from 1 to 30 minutes.

7. A method as recitd in claim 1 wherein the step of shearing the first solution is accomplished by pumping the fluid through a group of at least three shear plates in series, each plate containing a plurality of orifices, the pressure differential across the group of shear plates being from 300 to 900 pounds per square inch.

8. A method as recited in claim 7 wherein the differential pressure is from 400 to 800 pounds per square inch.

9. A method as recited in claim 1 wherein the step of shearing the first solution is accomplished by pumping the fluid through a group of at least three shear plates each containing at least one orifice, the pressure differential across the group of shear plates being from 700 to 1900 pounds per square inch.

10. A method as recited in claim 1 wherein the differential pressure is from 800 to 1800 pounds per square inch.

11. In a method of recovering oil from a subterranean, petroleum-containing formation penetrated by at least one injection well and by at least one production well, both wells being in fluid communication with the formation, said formation also containing brine containing greater than 7.5 parts per million water soluble borates (as boron) comprising injecting an aqueous viscous solution of a polysaccharide containing in excess of 10 percent D-mannose wherein the improvement comprises preparing the fluid by the process comprising
   (a) preparing a first solution containing 0.1 to 4.0 percent by weight polysaccharide in water having a salinity less than 15,000 parts per million total dissolved solids and containing less than 7.5 parts per million water soluble borates (as boron),
   (b) shearing the first solution sufficiently to ensure that the filterability of first solution through a 3 μm filter will not increase with further shearing;
   (c) diluting the first solution with brine having greater than 50,000 parts per million total dissolved solids including more than 7.5 parts per million water soluble borates as boron, the volume ratio of the first solution and brine being sufficient to produce a second polysaccharide solution having a concentration of polysaccharide from 10 to 5,000 parts per million polysaccharide; and
   (d) shearing the second solution sufficiently to ensure that the filterability of the second solution through a 3 μm filter will not increase with further shearing.

12. In a method of recovering oil from a subterranean, petroleum-containing formation penetrated by at least one injection well and by at least one production well, both wells being in fluid communication with the formation, said formation also containing brine containing greater than 7.5 parts per million water soluble borates (as boron) comprising injecting an aqueous viscous solution of a polysaccharide containing in excess of 10 percent D-mannose, wherein the improvement comprises preparing the fluid by the process comprising
   (a) preparing a first solution containing 0.1 to 4.0 percent by wweight polysaccharide in water having a salinity less than 15,000 parts per million total dissolved solids and containing less than 7.5 parts per million water soluble borates (as boron),
   (b) shearing the first solution by pumping the fluid through a group of at least three shear plates in series, each plate containing at least one orifice whose diameter is from 0.79 to 6.35 millimeters, the differential pressure across the group of shear plates being from 300 to 900 pounds per square inch;
   (c) diluting the first solution with brine having greater than 50,000 parts per million total dissolved solids including more than 7.5 parts per million water soluble borates as boron, the volume ratio of the first solution and brine being sufficient to produce a second polysaccharide solution having a concentration of polysaccharide from 10 to 5000 parts per million polysaccharide; and
   (d) shearing the second solution by pumping the fluid through a group of at least three shear plates in series, each plate containing at least one orifice whose diameter is from 0.79 to 6.35 millimeters, the differential pressure across the group of shear plates being from 700 to 1900 pounds per square inch.

13. In a method of recovering oil from a subterranean, petroleum-containing formation penetrated by at least one injection well and by at least one production well, both wells being in fluid communication with the formation, said formation also containing brine containing greater than 7.5 parts per million water soluble borates (as boron) comprising injecting an aqueous viscous solution of a polysaccharide containing in excess of 10 percent D-mannose, wherein the improvement comprises preparing the fluid by the process comprising
   (a) preparing a first solution containing 0.1 to 4.0 percent by weight polysaccharide in water having a salinity less than 15,000 parts per million total dissolved solids and containing less than 7.5 parts per million water soluble borates (as boron),
   (b) shearing the first solution sufficiently to ensure that the viscosity of the first solution is constant with total shear;
   (c) diluting the first solution with brine having greater than 50,000 parts per million total dissolved solids including more than 7.5 parts per million water soluble borates as boron, the volume ratio of the first solution and brine being sufficient to produce a second polysaccharide solution having a concentration of polysaccharide from 10 to 5000 parts per million polysaccharide; and
   (d) shearing the second solution sufficiently to ensure that the rate which the second solution will pass readily through a 3 μm filter is constant with shear.

* * * * *